US006755592B2

United States Patent
Janssen

(10) Patent No.: US 6,755,592 B2
(45) Date of Patent: Jun. 29, 2004

(54) DEVICE FOR REPAIRING UNDERGROUND SEWERS

(76) Inventor: Franz Janssen, von-Monschaw-Strasse 6, D-47574 Goch (DE)

( * ) Notice: Subject to any disclaimer, the term of this patent is extended or adjusted under 35 U.S.C. 154(b) by 0 days.

(21) Appl. No.: 10/141,696

(22) Filed: May 7, 2002

(65) Prior Publication Data

US 2002/0192032 A1 Dec. 19, 2002

(30) Foreign Application Priority Data

May 8, 2001 (EP) .............................. 01110197

(51) Int. Cl.[7] .............................. F16L 55/16; F16L 55/18
(52) U.S. Cl. ................................. 405/184.1; 405/150.1; 405/184.3; 138/97; 138/98
(58) Field of Search .............................. 405/146, 150.1, 405/154.1, 184.1, 184.2, 184.3; 138/97, 98

(56) References Cited

U.S. PATENT DOCUMENTS

| 4,347,018 | A | * | 8/1982 | Wrightson et al. | ........ 405/150.1 |
| 4,647,072 | A | * | 3/1987 | Westman | ...................... 138/97 |
| 4,767,236 | A | * | 8/1988 | Rice | ......................... 405/184.3 |
| 5,034,180 | A | * | 7/1991 | Steketee, Jr. | ................. 264/516 |
| 5,066,208 | A | * | 11/1991 | Warmerdam | ................. 138/98 |
| 5,119,862 | A | | 6/1992 | Maimets et al. | |
| 5,186,215 | A | * | 2/1993 | Gilleland | ...................... 138/98 |
| 5,395,472 | A | * | 3/1995 | Mandich | ...................... 138/97 |
| 6,516,506 | B2 | * | 2/2003 | Donnelly et al. | ............. 138/97 |

FOREIGN PATENT DOCUMENTS

GB          2054781     *   2/1981  .................. 138/98

* cited by examiner

Primary Examiner—Jong-Suk (James) Lee
(74) Attorney, Agent, or Firm—Webb Ziesenheim Logsdon Orkin & Hanson, P.C.

(57) ABSTRACT

A device for repairing underground sewers, pipe or the like provided a cylindrical hollow body, which has an elastically expandable casing acting as an outer wall.

2 Claims, 2 Drawing Sheets

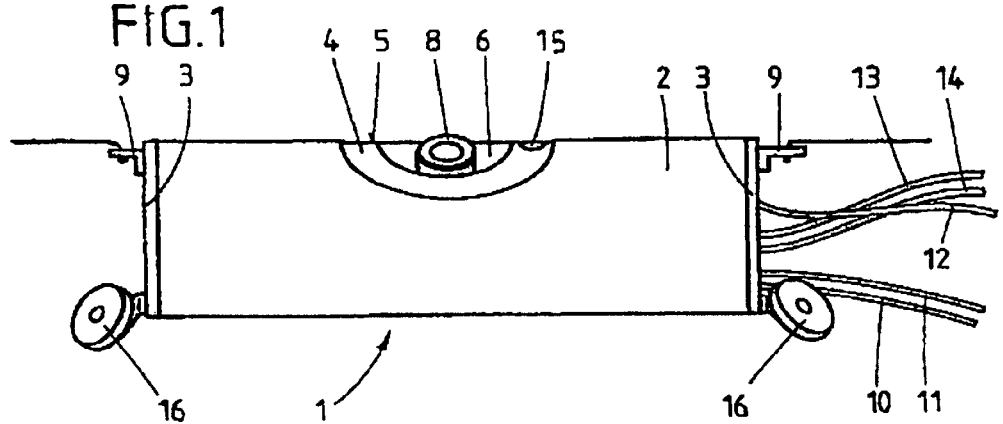
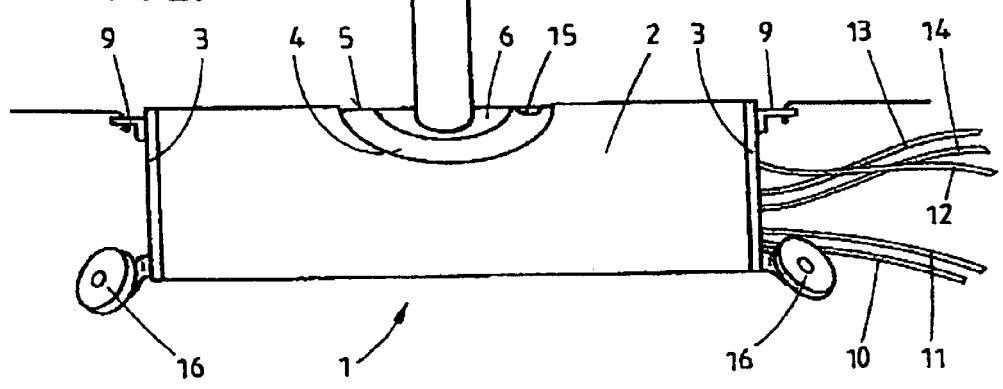
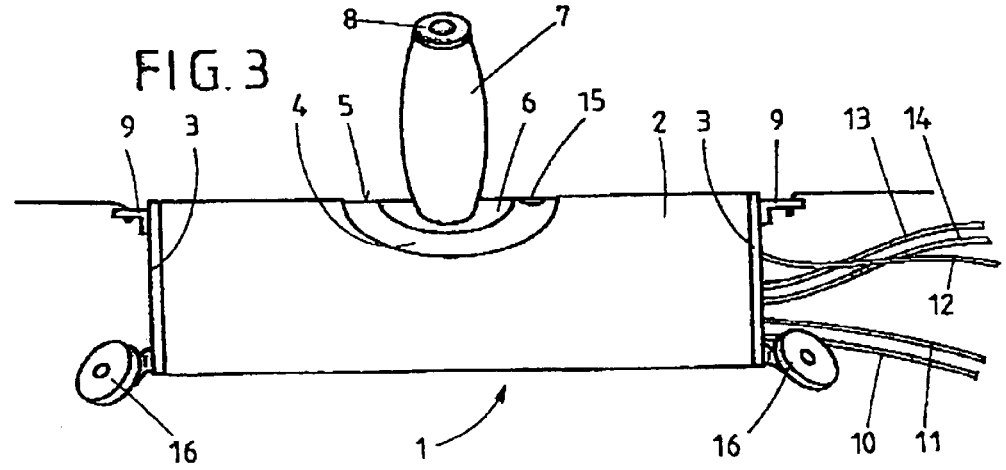

DEVICE FOR REPAIRING UNDERGROUND SEWERS

FIELD OF THE INVENTION

The invention relates to a device for repairing underground pipes, sewers or the like, that is, pipes which are generally laid in the ground and which consist of a material which tends to crack or break after many years of use, such as, for example, sewers. Moreover, the invention relates to uses of devices of this kind.

BACKGROUND OF THE INVENTION

Devices of this kind are already familiar in an extremely diverse range of embodiments and allow the repair and reconstruction of damaged areas in the region of the walls of underground, pipe-shaped sewers, without the need to expose the damaged areas.

Damage to underground pipes such as sewers occurs particularly in the region of connections from individual buildings opening into a collective sewer. Devices for the repair of damaged areas of this kind, which provide an auxiliary body or subsidiary body branching off from an inflatable main body which fits into the sewer are already known, wherein the auxiliary body or subsidiary body is also inflatable and can be introduced at a connecting place in a sewer connection within which it can be inflated in order to supply the material required for repair and reconstruction— for example, a two-component synthetic material mixture— through the main body to the damaged areas in a targeted manner.

A two-component synthetic material is used by preference as the repair medium, of which the two components are not combined until immediately before reaching the damaged area to be reconstructed, so that these can react with one another for a short period thereby hardening in the vicinity of the damaged area and the surrounding ground.

The devices already known for repair and reconstruction work of this kind are indeed usable and suitable in practice, however, they are associated with relatively high manufacturing and operating costs.

SUMMARY OF THE INVENTION

The invention is based on the object of providing a simplified device which is simpler to operate for the repair of imderground sewers or the like; which is also less expensive to manufacture; but which avoids the need for limitations of efficiency and usefulness.

In particular, the invention is intended to provide a device which is suitable for the repair of underground sewers in the region of connections to buildings.

Moreover, according to the invention, special uses of the device according to the invention are specified.

The device according to the invention provides a cylindrical, hollow body with a casing capable of elastic expansion which serves as the outer wall. The elastically expandable casing serving as the outer wall guarantees that the device can fit tightly inside a pipe-shaped sewer which is to be repaired. This avoids point-contact of the device and the associated overloading of the sewer. Furthermore, a device with a cylindrical cross-section provides sufficient space to accommodate further means, for example, a bellows which can be moved inward and outward in a lateral direction.

With one advantageous embodiment of the device according to the invention, it is possible to supply the synthetic material used for repair and reconstruction, especially a two-component material, to the relevant repair site in such a manner that this material cannot penetrate into areas covered by portions of the device which are expanded in the operating condition.

A collar or curved plate made, for example, from a rigid material and provided for this purpose is preferably fitted into the expandable hollow body and therefore follows the expanding movements of the hollow body, but even when the hollow body is expanded, the collar or curved plate lies in such a manner that a hollow cavity of the same thickness as the wall of the expandable casing of the main body of the device remains between this collar or plate and the relevant wall of the sewer to be repaired, into which repair material can penetrate and harden without this hardened material causing a disturbance after the device has been deflated or depressurised and removed from the repair area.

The plate-shaped collar provided in the elastically expandable hollow body of the device is curved in a cylindrical manner and adapted approximately to the diameter of the relevant sewers to be repaired and reconstructed. These diameters may, however, vary in certain regions, so that the device according to the invention can be used within a given bandwidth for sewers of different interior diameters, and similarly for the repair of pipe connections such as building connections of different diameters.

The elastically expandable bellows, which can be introduced into a sewer connection and inflated, can be completely retracted into the main body of the device so that it does not provide an obstacle when the device is being moved within the sewer to be repaired and, indeed, need not be used, if the device is to be used for repairing a sewer outside the region of a pipe connection.

Moreover, the cylindrical bellows, at the outer end of which a television camera is preferably provided, can be moved to different depths within a sewer connection, as required for the relevant repair or reconstruction.

In the device according to the invention, the cylindrical hollow body advantageously provides a casing surface of adjustable diameter. Accordingly, the hollow body can be adapted for different internal sewer diameters while retaining its cylindrical shape.

Cost-intensive structural changes are therefore not required to adapt the device for different sewer diameters.

Means are provided for enlarging the diameter of the hollow body. For example, this can be achieved with a mechanical, hydraulic or pneumatic device.

The cylindrical hollow body of the device according to the invention is advantageously a cylindrically curved plate, wherein preferably two edges of the plate overlap one another. This results in a cylindrical hollow body which is particularly inexpensive to manufacture. Because the edges are in contact with one another in an overlapping manner, it retains its cylindrical shape even if the diameter of the hollow body is altered. For example, the original diameter of the hollow body may be 33 cm. This can be expanded by way of adaptation to different internal sewer diameters from 35 to 42 cm. The device can therefore be used in a flexible manner without the replacement of parts.

The diameter of the casing of the cylindrical hollow body of the device according to the invention is advantageously adjusted by means of two bellows expandable with compressed air and located close to the end faces of the cylindrical hollow body. In this case, the elastic casing exerts a restoring force on the previously implemented adjustments. Attachment of the bellows close to the end faces of the cylindrical hollow body means that the casing of the cylindrical hollow body is pressed more tightly against the internal walls of the sewer at these places and exerts a more powerful sealing effect there than in the region of the casing between the bellows. Accordingly, repair material can also be pressed into the region between the casing and the internal wall of the sewer, which, with reference to the hollow cylinder, is located between the surfaces of the casing pressed against the internal wall of the sewer by the bellows.

When using an appropriate liquid repair material, a damaged, cracked sewer pipe can be repaired not only at the position on the casing surface of the cylindrical hollow cylinder from which the repair material is dispensed, but also covering a larger area over the entire circumferential casing surface of the cylindrical hollow body located between the bellows. In former times, it was conventional to break through sewer pipes with a pointed implement to provide an opening for connections to buildings. This caused hair-line cracks and resulting larger-scale damage to the sewer wall; however, these can also be repaired by means of the above-mentioned large-area repair measures.

The cylindrical hollow body of the device according to the invention advantageously contains one or more channel-like openings extending in an axial direction. This means that when the cylindrical hollow body is introduced into a sewer, the effluent contained in the sewer is not blocked and/or the sewage flow is not impeded.

The device according to the invention advantageously provides several hoses for the supply of a repair material consisting of several components and a mixer for mixing the components. In this manner, one component of the repair material can be supplied by each of the hoses. If a repair material is used which does not harden until all components come into contact with one another, separate supply in several hoses avoids hardening in the supply means and prevents the time-consuming salvage, dismantling and cleaning of the device before each repair operation. In particular, this can be achieved by "cleaning" the mixer and the parts of the device which have been in contact with the mixed, multiple-component repair material by rinsing briefly with only one component of the repair material after each mixing and repair procedure.

In the device according to the invention, the inflatable, elastically expandable, cylindrical bellows which can, if required, be introduced into a pipe connection of the sewer, advantageously allows a depth of penetration into the pipe connection of at least 50 cm. This means that any damage which extends beyond the connecting point of the pipe connection into the connecting pipe itself can be repaired. In this manner, it is possible, for example, to repair a first or even a second leaking connection sleeve of the pipe connection.

The device according to the invention advantageously provides one or more video cameras for monitoring and control. For example, one camera is fitted into the tip of the insertable, inflatable, elastically extendable, cylindrical bellows in order to position this in front of a pipe connection and to insert it therein. For example, further cameras may be attached at the end faces of a hollow cylinder in such a manner that the entire device including an ongoing reconstruction measure can be monitored. An ongoing repair process can be interrupted as soon as an excessive flow of repair material is observed beyond the actual repair site and the device.

Close to the end faces of the cylindrical hollow body, the device according to the invention advantageously contains two bladders and a compressed air line leading towards these bladders. Furthermore, a device may be provided for measuring a reduction in pressure in the region between the inflated bladders.

A further compressed air line, which opens between the two bladders towards the exterior of the cylindrical hollow body may be provided to measure the reduction in pressure. When compressed air is supplied, the device for measuring a reduction in pressure can determine whether the portion of the sewer between the two bladders is leaking. Accordingly, it is possible to carry out a leak assessment over the approximate length of the device. Furthermore, a check can be carried out immediately after the repair has been completed without needing to salvage the device and replace it with special pressure measuring equipment.

According to the invention, a resin consisting of two components is used in order to repair a sewer which requires reconstruction. In this context, the components are selected in such a manner that they do not tend to harden when they are kept separately. However, when these components come into contact with one another and are preferably mixed, a rapid hardening reaction of the mixture takes place. This prevents hardening within the device. Since water is avoided as a solvent, a repair can be carried out even in very damp, aqueous surroundings, for example, in the case of a sewage pipe located in the region of the ground water, without the risk that the repair material will be washed away, as might occur, for example, when using mortar.

By preference, a resin is used which is a thin liquid before hardening and which does not tend towards foaming during mixing and/or hardening, for example, a silicate resin. The use of a resin which does not tend to foam prevents any uncontrolled expansion of the repair material, for example, into effluent-carrying regions of the sewer. A resin which is a thin liquid before hardening can readily flow around the casing surface of the device during reconstruction and therefore allows the repair of a sewer over a large area. Moreover, it also readily penetrates through any cracks existing in the sewer to be renovated and into the surrounding ground, thereby improving the bedding of the sewer after hardening in addition to the actual reconstruction of the sewer.

The device according to the invention is used, for example, for the reconstruction of damaged sewer connections to buildings. It can also been used to cut off or separate from the public sewage network building connections which have been cancelled or taken out of operation. When the device according to the invention is used, the costintensive and time-consuming digging up of road and pavement surfaces is not necessary. Furthermore, the disadvantage of inadequate durability associated with closures based on inflated pipe-sealing cushions is avoided, because the closure is achieved by means of a hardening repair material.

The device according to the invention is used for the repair of several places in a sewer without the device having to be salvaged from the sewer between individual repair operations. For example, the use of a multiple-component repair material with several supply lines avoids the salvage, cleaning and possibly dismantling of the device in order to make it ready for a subsequent repair operation.

BRIEF DESCRIPTION OF THE DRAWINGS

The drawings provide a diagrammatic illustration of exemplary embodiments of the device according to the invention. The diagrams are as follows.

FIG. 1 shows a schematic external view of a first embodiment of the device in the deflated condition, in which it is introduced into a pipe-shaped, underground sewer and can be moved along the sewer in an axial direction, wherein the inflatable, elastically expandable, cylindrical bellows which can be introduced into a pipe connection of the sewer, has been completely retracted into the main body or hollow body of the device, FIG. 2 shows a view of the device as in FIG. 1, wherein, however, the inflatable, elastically expandable, cylindrical bellows which can be introduced into a pipe connection of the sewer has been extended from the hollow body of the device, and indeed approximately to its full length, FIG. 3 shows a view of the device similar to that shown in FIG. 2, wherein, however, the elastically expandable, cylindrical bellows is shown in the inflated condition.

DETAILED DESCRIPTION OF THE PREFERRED EMBODIMENTS

Figure 4:
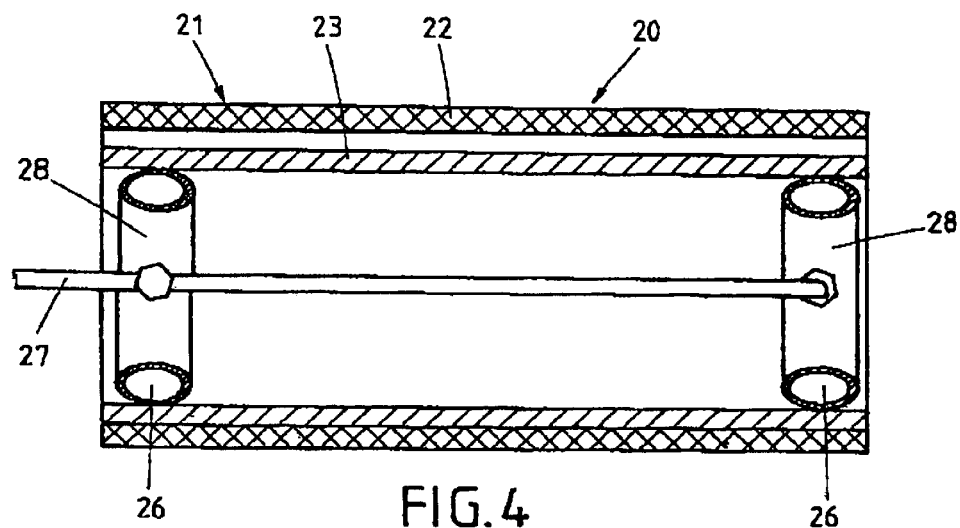
FIG. 4 shows a longitudinal section of a modified embodiment of the device according to the invention, wherein, in order to stretch and expand the casing of the device, hoses or bladders inflatable with compressed air are arranged close to the ends of the device.

Since the first embodiment of the device according to the invention shown in FIGS. 1 to 3 of the diagrams is shown outside of a pipe-shaped sewer, the proportions of the illustration are not the same as those which would result from use in an underground sewer.

The device according to the invention, which is suitable for repairing underground sewers or similar pipes, comprises as its main body a cylindrical hollow body 1, which is provided with an elastically expandable casing 2 serving primarily as the outer wall. The two ends of the casing 2 in this embodiment are each hermetically sealed with a circular, disk-shaped, rigid plate 3.

A plate or collar 4, which is made from a rigid material such as metal, which provides a circular outline, but is curved to correspond to the cylindrical shape of the hollow body 1, and wherein the outer side is set back towards the inside by the thickness of the wall of the casing 2, is fitted in the centre region of the cylindrical hollow body 1, in such a manner that, in the region of this plate or collar 4, a hollow cavity 5 always exists set back from the outer surface of the elastically expandable casing 2, into which the hardening material used for reconstructing the underground sewer can penetrate and spread before it penetrates the reconstruction site itself and solidifies there.

In the centre of the plate or collar 4, there is an opening 6, through which an elastically expandable bellows 7, which is wound on to a spool (not illustrated here) in the interior of the hollow body 1, can be extended outward when required. At the extendable, outer end of this bellows 7, there is a circular, rigid closure 8, which contains a television camera. The bellows 7 is provided in order to implement repair and reconstruction work in the region of a sewer connection such as a sewer connection for a building opening into the main sewer, the location of which has previously been determined by the camera located in the closure 8.

Comparison of FIGS. 2 and 3 shows that the elastically expandable cylindrical bellows 7 can be inflated during operation thereby pressing it against the interior wall of the building sewer connection to form a seal so that sealing material supplied can be controlled and directed in a targeted manner towards the site to be repaired. FIG. 3, which shows the bellows 7 in the inflated condition outside a pipe which essentially narrows it and which forms the building sewer connection, illustrates that, in the inflated condition, the bellows 7 expands less in the region of the opening 6, so that particularly in the connection region of pipes opening into the main sewer, repair material can be introduced in a targeted manner into the underground sewer pipe to be renovated and/or its parts.

Each of the circular rigid plates 3 provides a hook 9, to which a draw-rope, which is not illustrated, can be connected.

Two lines 10 and 11 open into the rigid plate 3 attached at the right-hand end of the hollow body 1—as seen in the diagram—for compressed air supplied to and/or removed from the cylindrical hollow body 1, when this is located in the operating position determined by the television camera fitted in the closure 8 and is to be inflated and/or deflated.

Moreover, an electrical cable 12 terminates at the rigid plate 3 shown on the right, which supplies the electrical energy to the spool, not shown in diagram, required for extending and retracting the bellows 7.

Furthermore, two hose lines 13 and 14 are passed through the rigid plate 3 shown on the right of the diagram, which open at and/or into a nozzle 15 and are used for the supply of two components of a synthetic mixture reacting with one another, which are mixed by means of the nozzle 15 and dispensed from the hollow body 1 into the reconstruction area of the underground pipes, not shown in greater detail in the present diagram.

Moreover, rollers 16 are mounted on the two rigid plates 3, which allow the cylindrical hollow body 1 to be displaced in the deflated condition through a pipe-shaped, underground sewer without the hollow body 1 needing to come into contact itself with the internal wall of this pipeline.

The embodiment 20 of the device according to the invention shown in FIG. 4 provides a cylindrical hollow body 21, which has an external, elastically expandable casing 22, in which a cylindrically curved plate 23 made from a substantially rigid material such as steel is embedded. This plate 23 forms a cylinder divided along a surface line, which is pressed together by the elastically expandable casing 22 in such a manner that the plate provides mutually overlapping ends 24 and 25. Depending on how tightly the elastically expandable casing 22, which is made, for example, from rubber material, is stretched, the device will have a larger or smaller external diameter, as can be seen by comparing FIGS. 5 and 6.

With the embodiment according to FIG. 4, expandable bladders or hose elements 26 are arranged close to the open ends of the cylindrical hollow body 21 and within the latter; these are connected to a line 27, through which compressed air can be supplied or also removed. The more the expandable hose elements 26 are charged with compressed air, the more powerfully they press from the inside against the cylindrically curved plate 23 and enlarge its external diameter, after which the elastically expandable casing 22 is also expanded at the same time as making its cross-section thinner, as shown in FIG. 6.

If the pressure in the expandable hose elements 26, which is produced pneumatically, for example, declines, the elastically expandable casing 22 will press the cylindrically curved plate 23 back into its starting position. This position is best illustrated in FIG. 5.

The hose elements 26 are designed in an annular form, so that they contain an inner, free cross-section 28 and/or an inner opening 28, through which liquid such as effluent can flow practically unhindered, so that the device 20 can also be used for reconstructing sewers or underground pipes, without the need to interrupt the operation of the sewer or the pipeline.

Figures 5, 6:
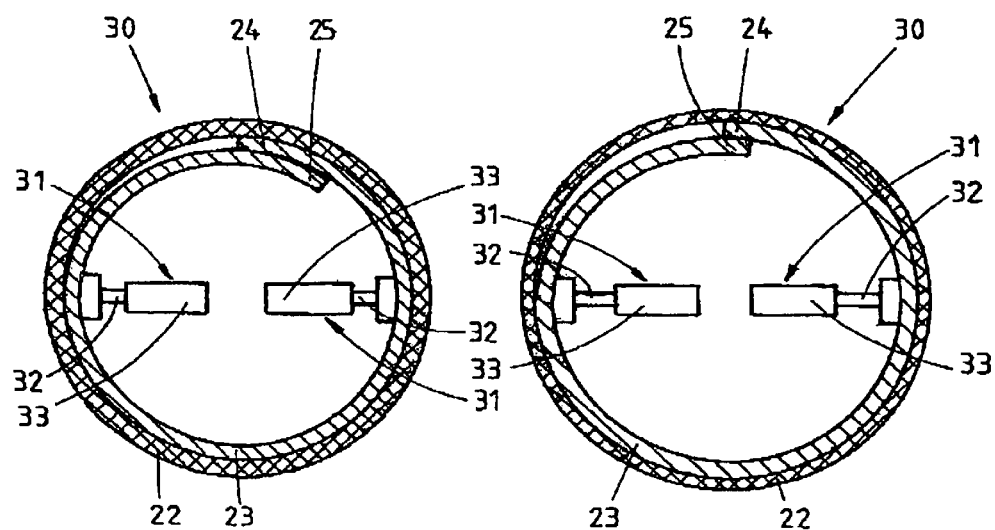
FIG. 5 shows a cross-section of an embodiment similar to that shown in FIG. 4, wherein, in order to stretch and expand the device, which is shown in the deflated condition, compressed-air cylinders are provided.
FIG. 6 shows a further cross-section of the device from FIG. 5 in an expanded condition providing a larger external diameter.

In the case of the embodiment shown in FIGS. 5 and 6, compression cylinders 31 are arranged in place of the expandable hose elements 6 in order to enlarge the outer diameter of the device 30; these are connected to a compressed-air line, which is not shown in the diagram. Depending on the pressure of the compressed air supplied, the pressure pistons 32 of the compression cylinder 31 extend out of the cylinder housing 33 to a greater or lesser extent, so that the external diameter of the device 30 can be adapted to the relevant internal diameter of the sewer or corresponding pipeline which is to be repaired and/or reconstructed.

With the embodiment according to FIG. 4 and also the embodiment according to FIGS. 5 and 6, the cylindrical hollow body 21 is open at both ends, so that the device, which can otherwise be designed as shown in FIGS. 1 to 3, can be used without the need to interrupt the operation of the sewer to be repaired and or reconstructed, because the effluent can flow through the hollow body of the device.

What is claimed is:

1. A collapsible, removable and reusable device for repairing an underground conduit having an interior surface, said device comprising an elastically expandable tube casing, within said tube casing a substantially rigid cylindrically curved plate with edges that overlap one another to form a cylindrical shape of continuously adjustable diameter within a bandwidth, and means in the interior of the casing for temporarily expanding the curved plate and casing from a starting position to adjust the diameter of the casing without blocking flow in the conduit, said means permitting the elastically expandable tube casing to thereafter press the curved plate into said starting position.

2. A device according to claim 1, characterized in that in order to enlarge the exterior diameter of the casing means for expanding the inside of the casing and curved plate by air pressure are provided close to the end faces of the curved plate.

* * * * *

UNITED STATES PATENT AND TRADEMARK OFFICE
CERTIFICATE OF CORRECTION

PATENT NO. : 6,755,592 B2
DATED : June 29, 2004
INVENTOR(S) : Franz Janssen

It is certified that error appears in the above-identified patent and that said Letters Patent is hereby corrected as shown below:

Column 8,
Lines 11 and 13, "the casing" should read -- the tube casing --
Line 12, "and casing" should read -- and tube casing --
Line 14, "said means permitting" should read -- said temporarily expandign means further permitting --
Lines 17-21, should read as follows:
-- 2. A device according to claim 1, characterized in that in order to enlarge the exterior diameter of the tube casing, said temporarily expanding means being operated by air pressure and being provided close to the end faces of the curved plate. --

Signed and Sealed this

Twenty-first Day of December, 2004

JON W. DUDAS
*Director of the United States Patent and Trademark Office*